Aug. 7, 1945.  L. G. EHMANN  2,381,531
CARGO SLING HOOK
Filed April 12, 1944  2 Sheets-Sheet 1
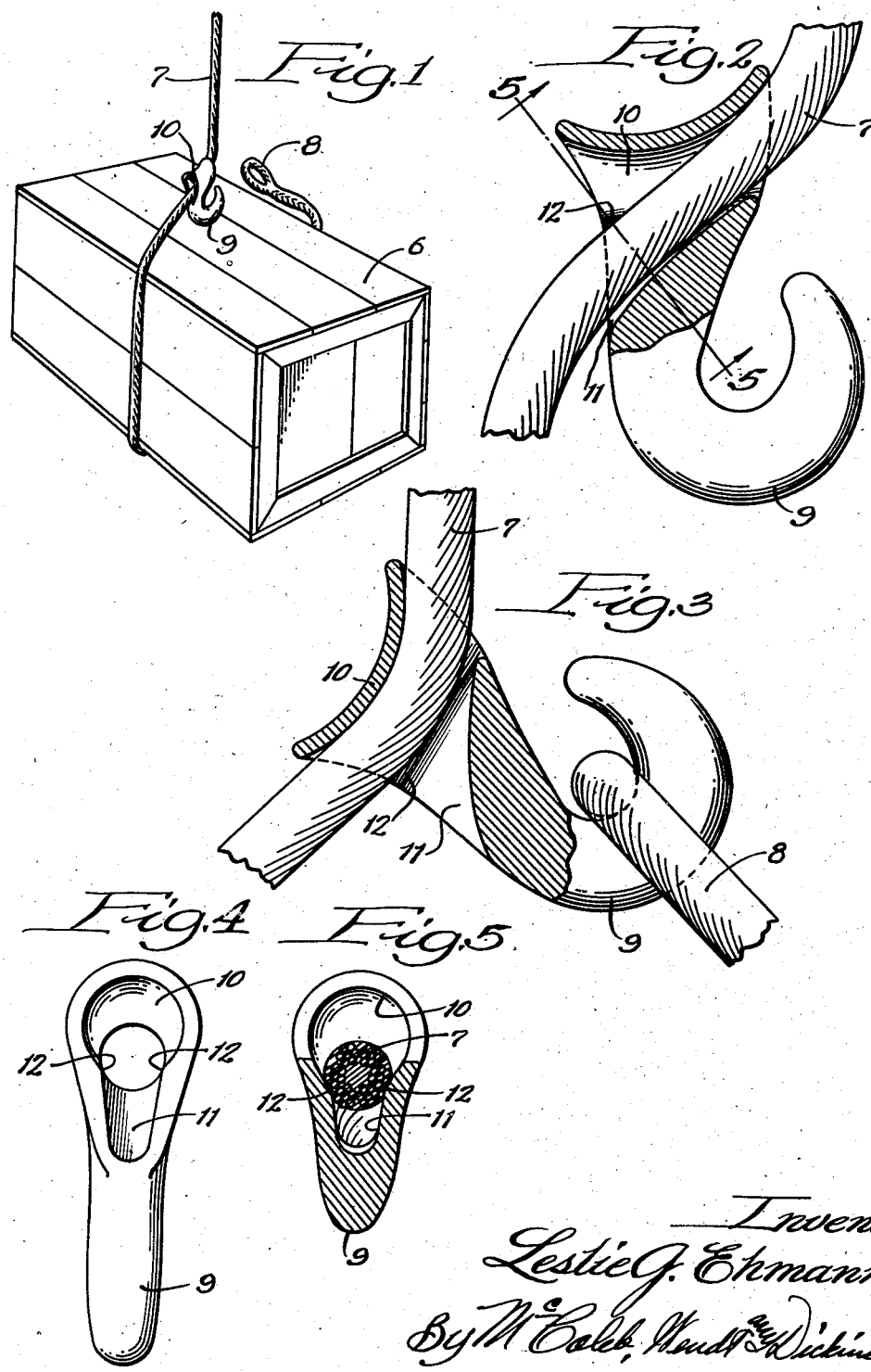
Inventor:
Leslie G. Ehmann,
By McCaleb, Wendt and Dickinson
Attorneys.

Aug. 7, 1945.  L. G. EHMANN  2,381,531
CARGO SLING HOOK
Filed April 12, 1944  2 Sheets-Sheet 2
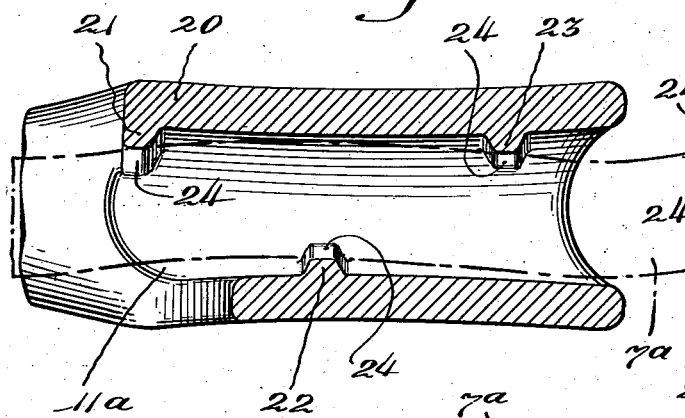
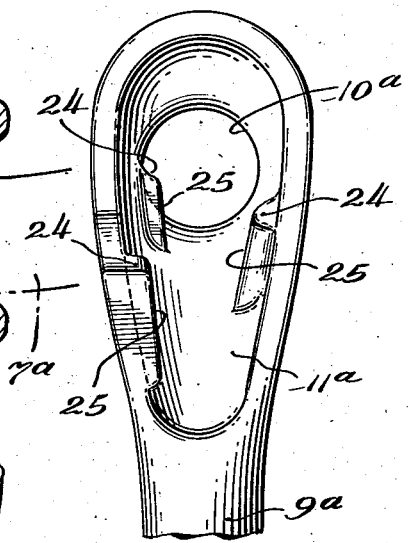
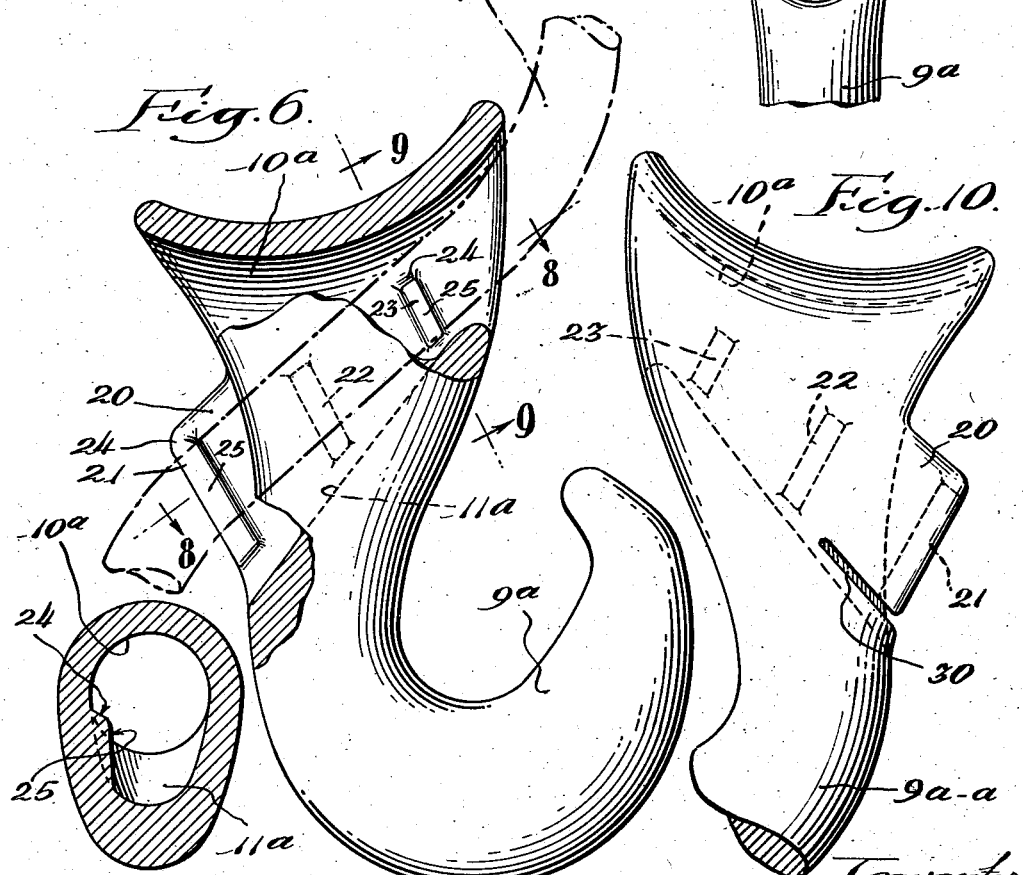
Inventor
Leslie G. Ehmann
By McCall, Wendt & Dickinson
Attorneys Patented Aug. 7, 1945

2,381,531

UNITED STATES PATENT OFFICE 2,381,531

CARGO SLING HOOK

Leslie G. Ehmann, Portland, Oreg., assignor to Electric Steel Foundry, Portland, Oreg., a corporation of Oregon Application April 12, 1944, Serial No. 530,587

5 Claims. (Cl. 294—74)

My invention contemplates and provides an improved cargo sling hook.

A salient object of the invention is to provide a hook capable of detaining itself against gravitation from elevated positions along its associated rope or cable, in which no curved lug, or other protuberance engaging around the rope or cable, is required. A protuberance engaging around the rope or cable to detain the hook thereon is very apt to become broken in the use of the hook—particularly if cargo lifting strain is exerted upon the rope or cable before it is volitionally disengaged from the embrace of the protuberance.

Another object of the invention is to provide a hook capable of one-hand manipulation into self-detaining relationship with its associated rope or cable at any elevated position along the latter.

Another object of the invention is to provide a hook which automatically relinquishes any previously established self-detaining relationship with its associated rope or cable when the latter has been put under tension while cooperating with the hook as a cargo sling.

These and other objects, features and advantages of my invention will appear from the following description wherein reference is made to the accompanying sheets of drawings, in which:

Figure 1 is a perspective view of a cargo sling in which the hook of my present invention is utilized;

Fig. 2 is a view, partly in section and partly in elevation, of one form of the improved hook and a fragment of its associated rope or cable—this view illustrating the hook as it appears after having been manipulated into self-detaining relationship with the rope or cable at an elevated position along the latter;

Fig. 3 is a view generally similar to Fig. 2 but illustrating the hook as it appears after relinquishing its self-detaining relationship with the rope or cable pursuant to the latter being put under tension while cooperating with the hook as a cargo sling;

Fig. 4 is a rear elevational view of the hook per se;

Fig. 5 is a detailed view, partly in section and partly in elevation, taken on the line 5—5 of Fig. 2 and looking in the direction indicated by the arrows;

Fig. 6 is a side view, partly in section and partly in elevation, of a second embodiment of my invention;

Fig. 7 is a rear elevational view of the hook shown in Fig. 6;

Fig. 8 is a sectional view which may be regarded as taken on the line 8—8 of Fig. 6 and looking in the direction indicated by the arrows;

Fig. 9 is a sectional view which may be regarded as taken on the line 9—9 of Fig. 6 and looking in the direction indicated by the arrows; and Fig. 10 is a side elevational view of a hook constituting a third embodiment of the present invention.

Similar characters of reference refer to similar parts throughout the several views.

Referring to Fig. 1, a cargo 6 is adapted to be embraced by a sling consisting of the rope or cable 7 provided at one end with the conventional loop 8 for engagement with the hook 9. It is with the structure of the hook 9 that the present invention is particularly concerned.

As is usual in cargo sling hooks, the hook 9 is provided with a sleeve 10 which receives and is normally capable of sliding freely on the rope or cable 7—such sleeve being so conformed as to flare somewhat at its ends and to present a longitudinally convex curvature to the rope or cable 7 when the latter is disposed as shown in Fig. 3.

Communicating with the passage through the sleeve 10, at the bottom of said passage, is a squeezing channel 11 which is of downwardly tapering cross-section and of progressively greater depth from the front to the back of the hook, being quite deep at the back of the hook and having its bottom merging into the bottom of the sleeve passage near the front of the hook. The width of the squeezing channel at its top is a little larger than the diameter of the rope or cable 7, while its bottom has a width substantially less than the diameter of the rope or cable. The shoulders 12, 12, which occur where the squeezing channel opens into the passage through the sleeve 10, preferably are somewhat rounded as shown in the drawings.

In using the hook 9 it is frequently desirable to have the same temporarily detailed at an elevated position on the rope or cable 7 as shown in Fig. 1, so that it will be readily and conveniently accessible for engagement with the loop 8 after the sling has been passed around the cargo.

The hook 9 readily may be caused temporarily to detain itself at any elevated position on the rope or cable by being so manipulated that the rope or cable enters the channel 11 and is squeezed by the downwardly converging side walls of the latter.

Another important advantage of the hook 9 is that it automatically relinquishes its self-detaining relationship with the rope or cable when the closed sling is tightened around the cargo—placement of the sling under tension causing the rope or cable to shift out of the embrace of the squeezing channel 11 and into free sliding engagement with the longitudinally convex upper inner surface of the sleeve 10, as depicted in Fig. 3.

The hook 9 of Figs. 1 to 5 inclusive is particularly advantageous when used in association with a non-metallic rope or cable, but its use is not so limited. The hook of Figs. 6 to 9 inclusive, and the hook of Fig. 10, are particularly advantageous when used in conjunction with a metallic rope or cable, but their use is not so limited.

The hook 9a of Figs. 6 to 9 inclusive is quite similar to the hereinbefore-described hook 9. It is provided with a sleeve 10a and a squeezing channel 11a, corresponding to the sleeve 10 and channel 11 of hook 9. It also has additional features not present in hook 9. Such additional features are the rearward extension 20 and the cuneiform ribs 21, 22 and 23.

Extension 20 is an integral part of the hook and its inner surface constitutes a prolongation of the left side (Fig. 7) of the squeezing channel 11a. It carries the rib 21 which is substantially spaced from, parallel with, and on the same side of the squeezing channel 11a as the rib 23. Disposed on the other side of the squeezing channel, and midway between the ribs 21 and 23, is the rib 22.

Each of the cuneiform ribs 21, 22 and 23 is an integral part of the hook, has a beveled upper end 24, and an elongated straight edge or surface 25 for substantially tangential engagement with the rope or cable 7a when the latter occupies the squeezing channel 11a. The straight edge 25 of wedging rib 22, and the common plane of straight edges 25 of the wedging ribs 21 and 23, converge downwardly. The beveled upper edges 24 of the ribs 21, 22 and 23 generally correspond in function with the shoulders 12 of the previously described hook 9.

In employing the hook 9a of Figs. 6 to 9 inclusive, manipulation of the rope or cable 7a into the squeezing channel 11a results in the rope or cable being squeezed by the cuneiform ribs 21, 22 and 23, and being slightly deformed to dog's leg contour intermediate the ribs 21 and 23 (see Fig. 8). Such squeezing and slight deformation of the rope or cable by the ribs is amply sufficient to retain the hook at any desired elevated position on the rope or cable. However, since the ribs 21, 22 and 23 present straight edges to the rope or cable, and thus cannot engage around it, the hook 9a automatically relinquishes its self-detaining relationship with the rope or cable when the latter is tightened around the cargo—placement of the sling under tension causing the rope or cable to slide off the cuneiform ribs 21, 22 and 23, lose its dog's leg, and move into free sliding engagement with the longitudinally convex (transversely concave) upper surface of the sleeve 10a.

The structure of the hook 9a—a of Fig. 10 differs in but one respect from the hook 9a of Figs. 6 to 9 inclusive. In hook 9a—a the extension 20 is separated from the hook proper at slot 30, so that the sole junction between the hook proper and the extension 20 is along a line substantially spaced from and approximately parallel with the cuneiform rib 21 carried by the extension.

I prefer to cast my improved cargo sling hooks in metal that is characterized by a degree of inherent resiliency, e. g., a good grade of manganese steel. When hook 9a—a is cast in such metal, its extension 20 exerts an almost imperceptible but nevertheless desirable and consequential spring pressure against any substantially stiff (e. g. metallic) rope or cable upon which the hook is self-detained.

A salient advantage of each of my hereinbefore-described cargo sling hooks is that it may be manipulated by one hand into self-detaining relationship upon a metallic rope or cable, i. e., with but one hand on the hook and without necessity for at the same time grasping the rope or cable.

Having thus illustrated and described my invention, what I claim as new and desire to secure by Letters Patent of the United States is:

1. In a hook provided with a passage at one end of a hook portion to receive a rope or cable whereon the hook is slidable, a squeezing channel which opens into said passage, said squeezing channel having side walls which converge away from said passage and being substantially deeper at one of its ends than at the other end thereof, said squeezing channel being in a position relative to said hook portion such that the weight of the hook, when free, normally biases said rope or cable into the deep end thereof.

2. In a hook provided with a passage having a smooth curved wall and adapted to receive a rope or cable whereon the hook is slidable, a squeezing channel, formed in a wall portion of said passage, which may be caused to embrace the rope or cable for the purpose of temporarily detaining the hook at an elevated position along the rope or cable, the wall portion of said passage in which the squeezing channel is formed lying opposite said smooth curved wall portion of such passage which the rope or cable engages when it and the hook are cooperating under load, and a multiplicity of wedging ribs carried by the sides of the squeezing channel, two of said ribs being carried by the same side of the squeezing channel and adapted to engage the rope or cable at spaced-apart points, and another of said ribs being carried by the other side of the squeezing channel and adapted to engage the rope or cable at an intermediate point and to conform it as a dog's leg.

3. In a hook adapted to be slidable along a rope or cable with which it is used and temporarily to be detained at an elevated position on said rope or cable, the combination comprising a sleeve integral with the hook and defining a passage through which the rope or cable is slidable, said hook having a squeezing channel formed therein longitudinally of the sleeve and capable of receiving and gripping the rope or cable for the purpose of temporarily detaining the hook at an elevated position along the rope or cable, the weight of the hook relative to the sleeve and squeezing channel being balanced normally to bias the squeezing channel into gripping engagement with the rope or cable, and transverse ribs on the sides of the squeezing channel for engagement with the rope or cable.

4. In a hook adapted to be slidable along a rope or cable with which it is used and temporarily to be detained at an elevated position on said rope or cable, the combination comprising a sleeve integral with the hook and defining a passage through which the rope or cable is slidable, said hook having a squeezing channel formed therein longitudinally of the sleeve and capable of receiving and gripping the rope or cable for the purpose of temporarily detaining the hook at an elevated position along the rope or cable, and the weight of the hook relative to the sleeve and squeezing channel being balanced normally to bias the squeezing channel into gripping engagement with the rope or cable.

5. In a hook adapted to be slidable along an upwardly extending rope or cable with which it is used and temporarily to be detained at an elevated position on said rope or cable, the combination comprising, top and bottom sides on said hook, the open side of said hook facing in the direction of the top side, means integral with said hook providing a passage extending from top to bottom near one end of the hook to receive said rope or cable whereon the hook is slidable upwardly and downwardly, a squeezing channel facing endwise and away from said hook and opening into said passage, said squeezing channel being substantially deeper at the bottom end than at the top end thereof.

LESLIE G. EHMANN.